Dec. 17, 1940.  J. P. FABER  2,224,958
WELDING MANIPULATOR
Filed April 2, 1938
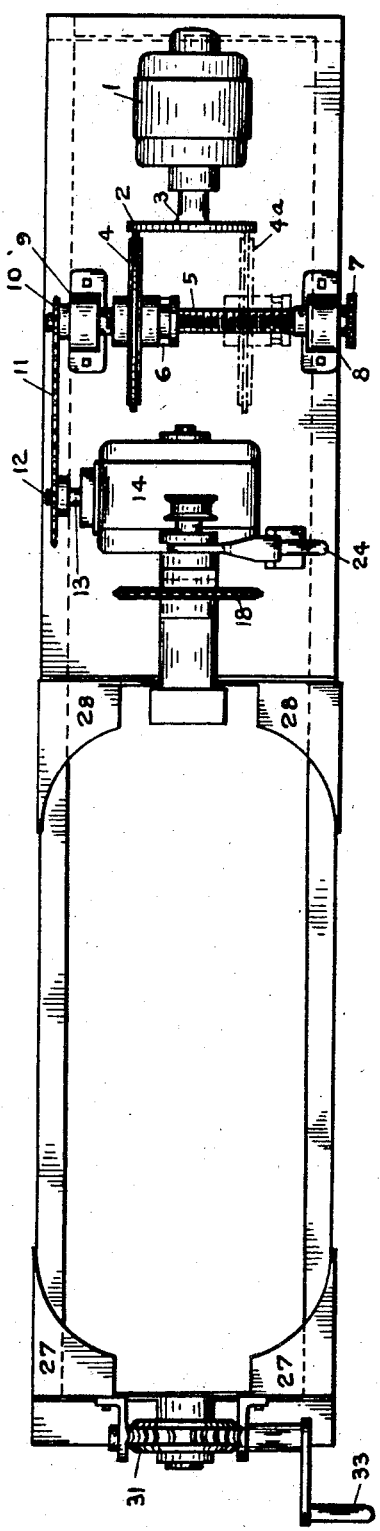
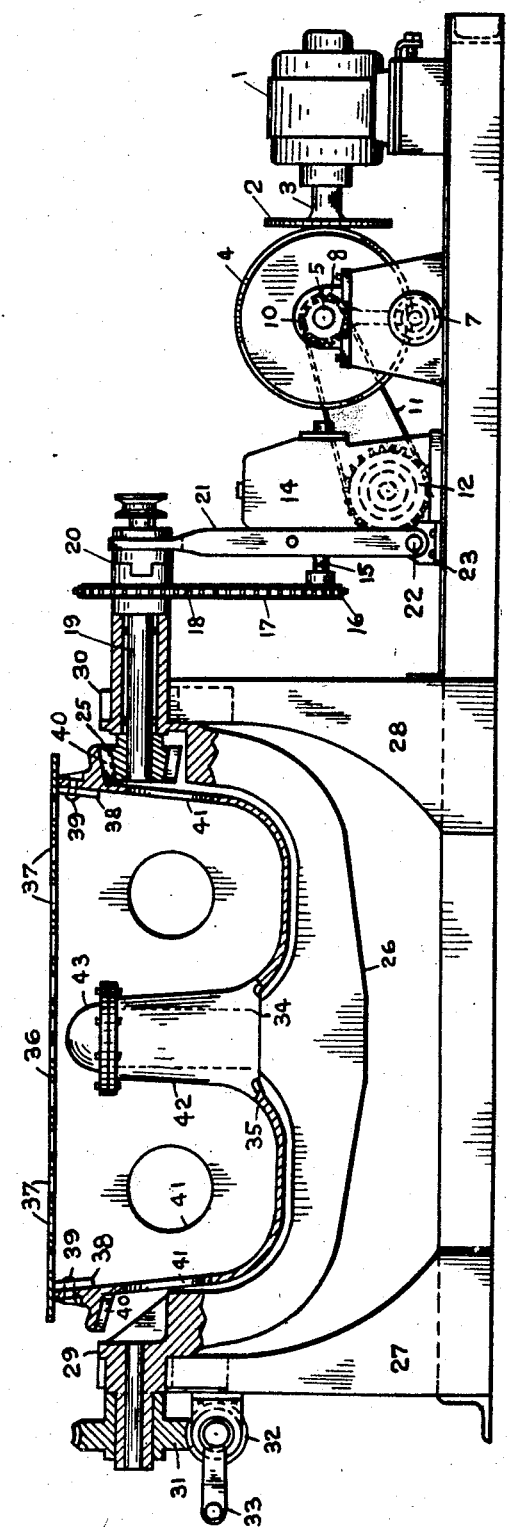
INVENTOR.
John P. Faber,
BY
S. J. Cox.
ATTORNEY.

Patented Dec. 17, 1940

2,224,958

UNITED STATES PATENT OFFICE 2,224,958

WELDING MANIPULATOR

John P. Faber, Dunellen, N. J., assignor to Ransome Concrete Machinery Company, Plainfield, N. J., a corporation of New Jersey Application April 2, 1938, Serial No. 199,566

2 Claims. (Cl. 29—89)

The improvements relate to welding manipulators and more particularly to the operation and control of said manipulators. Specifically the improvements relate to mechanical operation and control of such means and to certain mechanical connections pertinent thereto.

The objects of the improvements include the provision of means for operating the manipulator at varying speeds, and angles and means for effectively disconnecting the operating mechanism so that manual operation may be used as desired by the operator. Further and incidental objects and advantages of the improvements appear in connection with the following description in which the accompanying drawing is referred to.

In the drawing, Fig. 1 is a top view of the manipulator and driving mechanism with the table removed;

Fig. 2 is a side elevation, partly in medial vertical section, of the manipulator as shown in Fig. 1 but with the table in position.

The construction and operation of the manipulator, as herein shown, is exemplary, and may be varied within certain limits without departing from the scope of the present improvements which may be embodied in apparatus of this character of various construction and arrangement.

In the drawing 1 represents the source of power, 2 is the power friction disk which is fixed on the power shaft 3. The friction wheel 4 is mounted on the splined shaft 5 and by means of the yoke 6 in such a manner that by turning the hand wheel 7 the wheel 4 is caused to travel over the face of the friction wheel 2 thus varying the speed ratio of the mechanism from full speed forward to full speed reverse as indicated by the position of the dotted lines at 4a. The splined shaft 5 is journalled in the bearings 8 and 9, and on the end of this shaft is secured a sprocket wheel 10 over which passes the endless chain 11 which meshes with the sprocket 12 affixed to the primary shaft 13 of any well known make of reducing gear box 14.

Referring to Fig. 2 of the drawing, the secondary shaft 15 of the gear box 14 is fitted with a sprocket 16 over which meshes the chain 17 in turn with the sprocket 18 affixed to the shaft 19 by means of the clutch 20. Half the clutch 20 is supported by the brace 21, which is pivoted at 22 to an angle arm 23, the clutch 20 being operated by the handle 24 shown in Fig. 1. On the end of the shaft 19 is affixed a bevel gear 25.

The yoke 26 is carried by the posts 27 and 28 and the bearings 29 and 30. The outer end of the yoke 26 has a worm gear 31 thereon which is in mesh with the worm 32 turned by the handle 33. The center of the yoke 26 is a king pin 34 upon which is mounted the revolving bowl 35 carrying the table 36 and having hand holes 41 giving access to the interior thereof and to the underside of the table. The bowl is mounted on the pin or post 34 by means of an axial tubular bearing post 42 receiving it and having a removable lubricating cap 43. The bowl 35 has gear teeth 40 around its upper edge which mesh with the gear teeth 25 of the shaft 19 whereby the bowl is rotated. The table 36 is studded with holes 37, and is fastened to the upper edge of the bowl 35 as by means of depending flanges 38 and bolts 39.

In practice, the operation of the mechanism is as follows. The work to be welded is placed on the table top 36 and bolted or clamped through the slots 37, access to the interior of the table 35 being provided by the holes 41. The work having been securely fastened to the table top a welding terminal is connected to any part of the frame and the motor started. By manipulation of the adjustment wheel 7 the desired speed of the table is obtained. Adjustment of the table for the best angle to facilitate easy working conditions is obtained by turning the tilting handle 33 which in turn revolves the worm gear 32 and thus operates the gear 31 and tilts the table to either forward or backward position up to nearly 90 degrees in either direction. When the correct angle has been reached, the electric motor is started thus revolving the shaft 19 and gear 25. The gear 25 being in engagement with the gear teeth 40 of the bowl thus revolves it and the table at a speed which has previously been determined by adjustment of the wheel 7. The whole table device thus revolves on the central king bolt bearing 34 which is positioned in the center of the yoke 26.

It will be seen from the foregoing that the improvements provide means for efficient and rapid welding. The table top 36 is removable and may be substituted for one of any desired size depending upon the size of the work to be welded. The speed adjustment means provides a wide range of constant speeds which is necessary in the quick and efficient welding of various articles. Furthermore, the tilting adjustment allows the work to be swung into any desired position at the will of the operator, and should the operator desire to work at different parts of the machine and get at them quickly he may do so by disengaging the clutch and spinning the table manually, thus he need not wait for the table to revolve to the desired position and need not move from his position in front of the machine.

One of the peculiar features of the improvements is the bowl-like tilting and rotating support for the table proper, which is strong, simple and effective in construction and operation and supports the table and the work thereon very securely and in such a manner that it can be welded conveniently and efficiently.

As the speed reducing gears effect a very great reduction of the speed and movement of the work table 36 relative to that of the motor, any movement of the said table except under the drive of the motor is checked by the friction and inertia of the gears and the table will remain in any position to which it has been rotated without being locked. Moreover as such speed reducing gears commonly include worm and worm wheel transmission the table will be automatically and effectively locked thereby against rotary movement when not being driven.

What I claim is:

1. In a welding manipulator, a table, means for securing work to said table, a hollow bowl-like oscillatory support upon which said table is secured, a yoke extending beneath said bowl, a support for said yoke permitting swinging movement thereof, and means for swinging said yoke, bowl and table and securing them in different positions to which they are swung, a bearing between said yoke and bowl member, whereby said member may be rotated in the yoke, said bearing comprising an upright post on one centrally located with respect to said yoke and bowl member and a sleeve on the other surrounding said post.

2. In a welding manipulator, a table, means for securing work to said table, a hollow bowl-like oscillatory support upon which said table is secured, a yoke extending beneath said bowl, a support for said yoke permitting swinging movement thereof, and means for swinging said yoke, bowl and table and securing them in different positions to which they are swung, a bearing between said yoke and bowl member, whereby said member may be rotated in the yoke, said bearing comprising an upright post on one centrally located with respect to said yoke and bowl member and a sleeve on the other surrounding said post, said bearing forming also a support for the bowl member and the bowl member being otherwise free of the yoke.

JOHN P. FABER.